United States Patent [19]

Heins et al.

[11] 3,923,876
[45] Dec. 2, 1975

[54] COMPLEX FORMERS FOR POLYVALENT METAL IONS

[75] Inventors: Arnold Heins, Hilden; Helmut Blum; Karl-Heinz Worms, both of Duesseldorf-Holthausen, all of Germany

[73] Assignee: Bayer Aktiengesellschaft, Leverkusen, Germany

[22] Filed: Apr. 9, 1973

[21] Appl. No.: 349,347

[30] Foreign Application Priority Data
Apr. 13, 1972  Germany............................ 2217692

[52] U.S. Cl.... 260/502.4 R; 204/45 R; 204/DIG. 2; 210/58; 252/8.6; 252/82; 252/89; 252/121; 252/389 R; 252/DIG. 11; 252/DIG. 17; 260/438.1; 260/439 R; 260/501.19; 260/502.4 P; 260/961; 260/DIG. 4
[51] Int. Cl.$^2$............................................. C07F 9/38
[58] Field of Search .... 260/4381.1, 439 R, 502.4 P, 260/502.4 R

[56] References Cited
UNITED STATES PATENTS

| | | | |
|---|---|---|---|
| 3,236,863 | 2/1966 | Smith et al.................. | 260/502.4 R |
| 3,293,176 | 12/1966 | White............................ | 260/502.4 R |
| 3,579,570 | 5/1971 | Nicholson et al. ........... | 260/502.4 P |
| 3,833,690 | 9/1974 | Kerst............................ | 260/502.4 P |

OTHER PUBLICATIONS
Bull. Acad. Sci. USSR, Dir. Chem. Sci. (English translation) 1952, pp. 821–824.

*Primary Examiner*—Joseph E. Evans
*Attorney, Agent, or Firm*—Burgess, Dinklage & Sprung

[57] ABSTRACT

The present invention relates to compounds of the general formula

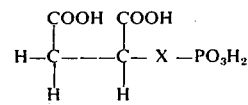

in which X represents the group

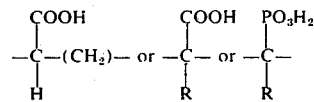

and wherein R is a hydrogen atom, an alkyl radical with 1 to 4 C-atoms or a phenyl radical. These compounds may be used for the preparation of complex compounds with polyvalent metal ions.

10 Claims, No Drawings

COMPLEX FORMERS FOR POLYVALENT METAL IONS

Compounds of different structure may be used to prevent the precipitation of polyvalent metal ions. Examples of known complex formers include aminoacetic acids or their alkali salts, of which nitrilotriacetic acid and alkylene diamine tetracetic acid are particularly suitable because they effectively bind the salts responsible for hardness in water and also heavy metal ions. Unfortunately, these substances suffer from the disadvantage that they have to be present in stoichiometric quantities in order to obtain complex formation. Polyphosphates are also used for purposes such as these, having the advantage that they are also effective in substoichiometric quantities.

Unfortunately, polyphosphates are not resistant to hydrolysis under certain conditions. It is also undesirable in certain cases to use large quantities in detergents and cleaning agents.

For this reason, some polyphosphonic acids, such as, for example, hydroxyethane diphosphonic acid and aminotrimethylene phosphonic acid, have also been used as complex formers because compounds such as these can also be used in substoichiometric quantities and are resistant to hydrolysis. However, in these compounds, too, the phosphorus content is relatively high.

It has now been found that organic compounds corresponding to the general formula (I) shown below can be used as complex formers, being especially suitable in that they can be used in substoichiometric quantitites, they are resistant to hydrolysis and they have a relatively low phosphorus content. According to the invention, there is provided a compound corresponding to the general formula (I)

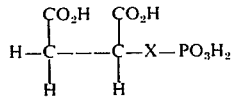

in which X represents the group:

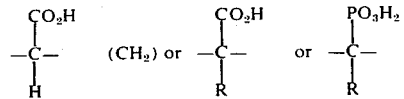

wherein R represents hydrogen, alkyl with 1 to 4 C-atoms and phenyl.

There is also provided a process for the preparation of a complex, in which at least one compound as described above is brought into contact with at least one polyvalent metal ion.

Instead of the acids, it is also possible to use the corresponding water-soluble salts, such as the potassium, sodium or ammonium salts or the salts with organic bases, especially alkanolamines such as monoethanolamine, diethanolamine or triethanolamine. Production can be carried out by completely or partly neutralizing the acids with inorganic or organic bases, such as NaOH, KOH, NH$_4$OH or alkanolamines, and also with alkali carbonates.

The following compounds correspond to the above formula (I): 1-phosphonopropane-1,2,3-tricarboxylic acid, 1-phosphonobutane-2,3,4-tricarboxylic acid, 1,1-diphosphonopropane-2,3-dicarboxylic acid, 2-phosphonobutane-2,3,4-tricarboxylic acid and 2,2-diphosphonobutane-3,4-dicarboxylic acid. 1-phosphonopropane-1,2,3-tricarboxylic acid can be obtained by reacting maleic acid ester with phosphonoacetic acid ester in the presence of an alcoholate and subsequently hydrolyzing the ester obtained. 1-phosphonobutane-2,3,4-tricarboxylic acid can be obtained by reacting dimethyl phosphite with 1-butene-2,3,4-tricarboxylic acid ester in the presence of a sodium alcoholate and subsequently hydrolyzing the ester obtained to form the required acid.

The reaction of a methylenediphosphonic acid alkyl ester with a maleic acid alkyl ester in the presence of a sodium alcoholate gives an ester which can be converted by acid hydrolysis into 1,1-diphosphonopropane-2,3-dicarboxylic acid.

2-phosphonobutane-2,3,4-tricarboxylic acid can be obtained by reacting α-diethyl phosphonopropionic acid methyl ester with maleic acid diethyl ester in the presence of an alcoholate and subsequently hydrolyzing the ester obtained.

2,2-diphosphonobutane-3,4-dicarboxylic acid may be obtained by reacting maleic acid ester with ethane-1,1-diphosphonic acid ester in the presence of sodium alcoholate and subsequently subjecting the product obtained to acid hydrolysis.

The phosphonic acids described above can be converted into the corresponding salts in a known manner by neutralization with alkali hydroxides, ammonium hydroxide or mono-, di- or tri-ethanolamine.

The above-mentioned compounds, including their alkali metal, ammonium or alkanolamine salts, are effective complex formers for alkaline, earth metal ions, especially calcium ions, and accordingly are particularly useful for water-softening purposes. They do not have to be used in stoichiometric quantities, and indeed the precipitation of calcite can be considerably retarded by using only substoichiometric quantities.

Similarly, they are also eminently suitable for use as corrosion inhibitors and anti-scale agents for cooling water, especially in combination with additives known per se, such as, for example, divalent zinc and/or cadmium salts, orthophosphates, chromates or hydrazine hydrate.

The particular stoichiometric quantity, corresponding to the compound used, can readily be determined through a simple test. In general, the complex formers are used in quantities of from 1 mole per 2,000 moles of metal ions up to 6 times the stoichiometric quantity.

By virtue of the properties referred to above, the new complex formers can also be used, for example, for decrusting fabrics in which alkali salts have been deposited, and for reducing the accumulation of ash in fabrics. They are also suitable for cleaning rigid materials, in particular metal or glass. In particular, they can be used as an additive for bottle-washing agents.

The complex-forming capacity can also be utilized with advantage in systems in which copper ions have an undesirable influence. For example, it can be used to prevent the decomposition of per-compounds or even for stabilizing fats and soaps. In addition, the aforementioned compounds are suitable for use as additives to dye baths for textiles, in order to bind in complex form metal ions producing undesirable discoloration.

Finally, the complex-forming capacity can also be utilized for feeding so-called trace eleements to plants. The outstanding complex-forming capacity of these compounds is also reflected in the fact that the well-known reddening, which is normally observed when thiocyanate is added to solutions containing a trivalent ion, no longer occurs. Accordingly, these properties can also be utilized with advantage to prevent the deposition of iron compounds, especially iron hydroxide, on fabrics or during bottle washing. The new compounds can also be used instead of cyanides in electroplating baths.

Finally, they are also suitable for use as components with complex-forming properties in detergents and cleaning agents, and can be used in combination with known anion-active, cation-active or non-ionogenic wetting agents. In addition, they can be used in combination with caustic alkalis, alkali carbonates and silicates, phosphates or borates.

The invention is illustrated by the following Examples:

EXAMPLE 1

0.5 mole of methylene diphosphonic acid tetraethyl ester is heated for 6 hours to 110°C with 0.5 mole of maleic acid diethyl ester in the presence of 25 ml of a saturated sodium ethylate solution. The sodium alcoholate is then neutralized with acetic acid and the reaction mixture is quickly distilled in vacuo in order to avoid decomposition. The crude distillate is re-distilled, the main fraction accumulating in the range from 190° to 213°C at a pressure of 0.05 Torr.

Yield: approximately 50%.

The ester obtained has the following analytical data (in % by weight):

|  | P | C | H |
|---|---|---|---|
| found: | 13.37 | 44.56 | 7.37 |
| calculated: | 13.48 | 44.34 | 7.39 |

The ester is hydrolyzed by boiling with concentrated hydrochloric acid. 1,1-diphosphonopropane-2,3-dicarboxylic acid crystallizes out after purification with active carbon and concentration of the hydrolysis product.

Yield: approximately 100 %, based on the ester.

The acid accumulates in the monohydrate form and has the following analytical data (in % by weight):

|  | P | C | H |
|---|---|---|---|
| found: | 19.89 | 19.74 | 3.85 |
| calculated: | 20.00 | 19.37 | 3.87 |

The molecular weight as determined by potentiometric titration is as follows:
found: 308
calculated: 310

The monohydrate has a melting point of 149° to 150°C.

The corresponding salts can be prepared from the acid by neutralization with inorganic bases.

EXAMPLE 2

1-butene-2,3,4-tricarboxylic acid trimethyl ester was reacted at 100° to 110°C with an equimolar quantity of dimethylphosphite in the presence of a saturated sodium ethylate solution. Neutralization of the ethylate with glacial acetic acid was followed by distillation under high vacuum. The main fraction distilled at 180° to 190°C under a pressure of 0.075 to 0.10 mm Hg.

Yield of ester: 80%.

The ester obtained has the following analytical data (in % by weight):

|  | P | C | H |
|---|---|---|---|
| found: | 9.04 | 42.08 | 6.17 |
| calculated: | 9.12 | 42.36 | 6.17 |

The ester thus obtained was hydrolyzed by boiling with moderately concentrated hydrochloric acid. Following evaporation of the water, 1-phosphonobutane-2,3,4-tricarboxylic acid was obtained in crystalline form.

Yield: 100 %, based on the ester.

Analytical data (in % by weight):

|  | P | C | H |
|---|---|---|---|
| found: | 11.18 | 30.40 | 3.81 |
| calculated: | 11.48 | 31.10 | 4.07 |

Melting point: 154° to 155°C

Molecular weight as determined by potentiometric titration:
found: 275
calculated: 270

EXAMPLE 3

0.5 mole of 160-diethylphosphonopropionic acid methyl ester is heated for 5 to 6 hours to 110°C with 0.5 mole of maleic acid diethyl ester and 15 ml of saturated sodium ethylate solution. Approximately 78% of the crude ester are obtained following neutralization by glacial acetic acid and rapid distillation. Re-distillation gives a yield of 69 % of pure ester at 164° to 170°C/0.05 mm pressure.

The ester obtained has the following analytical data (in% by weight):

|  | P | C | H |
|---|---|---|---|
| found: | 7.94 | 48.69 | 7.48 |
| calculated: | 7.83 | 48.49 | 7.32 |

The pentasodium salt of 2-phosphonobutane-2,3,4-tricarboxylic acid is obtained by hydrolyzing the ester with hydrochloric acid, followed by neutralization with sodium hydroxide. The salt accumulates in the form of an oil and is converted into the solid form by treatment with methanol.

Molecular weight as determined by phosphorus analysis:
found: 464
calculated: 462

EXAMPLE 4

0.224 mole of ethane-1,1-diphosphonic acid tetraisopropyl ester was reacted at about 105° to 110°C with an equimolar quantity of maleic acid diethyl ester in the presence of 15 ml of a saturated sodium ethylate solution. The reaction product was hydrolyzed by boiling with concentrated hydrochloric acid.

Following acid hydrolysis of the ester, the NaCl formed was separated off and the remaining sodium ions removed by ion exchange. The crude 2,2-diphosphonobutane-3,4-dicarboxylic acid was obtained in the form of a semi-solid paste by concentrating the solution.

EXAMPLE 5

0.5 mole of maleic acid dibutyl ester was reacted at about 100°C with 0.5 mole of phosphonoacetic acid triethyl ester in the presence of 20 ml of saturated sodium ethylate solution. The sodium alcoholate was neutralized with acetic acid and the reaction mixture was distilled in vacuo (195° to 205°C; pressure 0.3 mm Hg).

The ester thus obtained was hydrolyzed by boiling with hydrochloric acid. The 1-phosphonopropane-1,2,3-tricarboxylic acid obtained by concentration was converted into the pentasodium salt with sodium hydroxide at a pH-value adjusted to 12. The salt was obtained in crystalline form by the addition of methanol. The atomic ratio P:C:Na was 1:6.3:4.9 (calculated 1:6:5).

EXAMPLE 6

The complex-forming capacity of the compounds identified below with respect to calcium was determined by the so called Hampshire test. In this method, 1 g of the substance was dissolved in 100 ml of water, the resulting solution was adjusted to pH 12 with 2 N sodium hydroxide and 10 ml of a 2 % soda solution added. Calcium chloride solution was then added dropwise until a permanent haze was formed, the pH-value being kept constant.

(mg $CaCo_3$/1 g of substance) amounted to :

600 for 1-phosphonopropane-1,2,3-tricarboxylic acid
870 for 1,1-diphosphonopropane-2,3-dicarboxylic acid
260 for 1-phosphonobutane-2,3,4-tricarboxylic acid
1,100 for 2-phosphonobutane-2,3,4-tricarboxylic acid
1,400 for 2,2-diphosphonobutane-3,4-dicarboxylic acid

EXAMPLE 7

The complex-forming activity with respect to iron in a soda-alkaline solution of 1-phosphonopropane-1,2,3-tri-carboxylic acid and 1,1-diphosphonopropane-2,3-dicarboxylic acid is shown in the following Tables. The following test arrangement was used: in each test, 15 ml of a solution containing 5 mMol (millimoles) of soda were added to 10 ml of a 0.01 molar $FeCl_3$ solution. Increasing quantities of the complex formers specified in Tables 1 and 2 were added to these solutions, followed by heating to boiling point.

TABLE 1

| Complex former | mMol | Precipitation |
|---|---|---|
| 1-phosphonopropane-1,2,3-tricarboxylic acid | 0.3 | + |
|  | 0.4 | − |
|  | 0.5 | − |
|  | 0.6 | − |

TABLE 2

| Complex former | mMol | Precipitation |
|---|---|---|
| 1,1-diphosphonopropane-2,3-dicarboxylic acid | 0.02 | + |
|  | 0.04 | − |
|  | 0.06 | − |

TABLE 2-continued

| Complex former | mMol | Precipitation |
|---|---|---|
|  | 0.1 | − |

− = no precipitation
+ = precipitation in hydroxide form.

EXAMPLE 8

The complex-forming activity with respect to copper in a soda-alkaline solution of 1-phosphonopropane-1,2,3-tricarboxylic acid and 1,1-diphosphonopropane-2,3-dicarboxylic acid is shown in the following Tables. The following test arrangement was applied: in each test, 15 ml of a solution containing 5 mMol of soda were added to 10 ml of a 0.01 molar $CuCl_2$ solution. Increasing quantities of the complex formers specified in Tables 3 and 4 were then added to these solutions, followed by heating to boiling point.

TABLE 3

| Complex former | mMol | Precipitation |
|---|---|---|
| 1-phosphonopropane-1,2,3-tricarboxylic acid | 0.15 | + |
|  | 0.20 | − |
|  | 0.30 | − |

TABLE 4

| Complex former | mMol | Precipitation |
|---|---|---|
| 1,1-diphosphonopropane-2,3-dicarboxylic acid | 0.04 | + |
|  | 0.06 | − |
|  | 0.1 | − |

− = no precipitation
+ = precipitation in hydroxide form

EXAMPLE 9

Table 5 below illustrates the complex-forming capacity of 1-phosphonobutane-2,3,4-tricarboxylic acid with respect to iron and copper in a soda-alkaline solution. 15 ml of a solution containing 5 mMol of soda were added to 10 ml of 0.01 molar $FeCl_3$ and $CuCl_2$ solutions for the purposes of determination. The complex former was added to these solutions in increasing quantities, as shown in Table 5:

TABLE 5

| Concentration in mMol | Fe+++ | Cu++ |
|---|---|---|
| 0.2 | + | + |
| 0.3 | − | + |
| 0.4 | − | − |
| 0.5 | − | − |

+ = precipitation in hydroxide form
− = no precipitation

EXAMPLE 10

The organic compounds mentioned in Example 1 in the form of their alkali metal salts were added in quantities of from 2 to 50 mg/l to water samples of different hardness heated to elevated temperatures. In this way, incrustation in the apparatus, especially the heating units, was largely suppressed because the precipitations are almost completely amorphous and consequently do not lead to incrustation. The use of larger quantities actually produced a marked overall decrease in the precipitations.

EXAMPLE 11

A product of the following composition was used in a concentration of 1 to 2 % as a bottle-washing agent which prevents devitrification, even in the event of prolonged application in the warm-water zone:

78 % of caustic soda
4.5 % of sodium silicate ($SiO_2 : Na_2O = 3.35$)
1.75 % of an anti-foam agent
5 % of 1,1-diphosphonopropane-2,3-dicarboxylic acid in the form of its sodium salt
Balance sodium sulfate

EXAMPLE 12

Beer bottles, lemonade bottles and mineral-water bottles were washed in a conventional bottle-washing machine with a solid washing agent of the following composition:

60 % of caustic alkali
20 % of trisodiumphosphate, anhydrous
5 % of sodium silicate ($SiO_2 : Na_2O = 3.35$)
2.5 % of a non-ionogenic anti-foam agent
1.25 % of 1-phosphonopropane-1,2,3-tricarboxylic acid in the form of its sodium salt
1.25 % of amino tri-(methylene phosphonic acid) in the form of its sodium salt
10 % of sodium sulfate.

The washing agent was used in a concentration of 1.5 % in the washing solution, which was heated to a temperature of approximately 75°C. Even after prolonged use, there was no sign of any coating or scale formation in the washing machines.

EXAMPLE 13

A cleaning agent of the following composition was used in a concentration of 0.5 % for cleaning metal components:

44.0 % of trisodium monophosphates
50 % of sodium metasilicate
1.5 % of a non-ionogenic wetting agent
4.5 % of 1,1-diphosphonopropane-2,3-dicarboxylic acid in the form of its potassium salt.

EXAMPLE 14

A cleaning composition as follows was used as a textile washing agent:

42 % of tetrasodium diphosphate
5 % of sodium silicate
15 % of perborate
8 % of dodecylbenzene sulfonate
4 % of sodium soap (coconut fatty acid)
5 % of 1-phosphonobutane-2,3,4-tricarboxylic acid in the form of its sodium salt
Balance sodium sulfate and water.

The washing agent was used in a concentration of 5 g/l. There were no signs of any deposits in the washing machine, even after prolonged use.

EXAMPLE 15

Beer bottles were washed in a conventional bottle-washing machine with two washing compartments. A washing solution which contained 1 % of sodium hydroxide and to which an active concentrate of the following composition was added in a concentration of 0.2 %, was used in both washing compartments:

30 % of phosphoric acid
6 % of 1,1-diphosphonopropane-2,3-dicarboxylic acid
6 % of amino tri-(methylene phosphonic acid)
20 % of a non-ionogenic wetting agent (reaction product of polyglycerol with 7 mols of propylene oxide)
Balance water The washing solutions were used at a temperature of about 60°C and replenished as required by the addition of sodium hydroxide and the active concentrate. There were no signs of any scale formation in the warm-water zone, even after prolonged use.

What is claimed is:

1. A compound of the formula

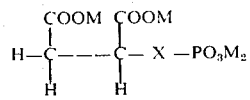

wherein X is selected from the group consisting of

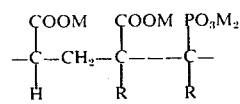

wherein M is selected from the group consisting of hydrogen, alkali metal and ammonium and R is selected from the group consisting of hydrogen, or alkyl radical with 1 to 4 carbon atoms and a phenyl radical and complexes thereof with alkaline earth metal ions.

2. A complex of claim 1 wherein M is sodium and the alkaline earth metal is calcium.

3. A complex of claim 1 where the alkaline earth metal ions are selected from the group consisting of magnesium, calcium, strontium, barium and mixtures thereof.

4. A compound of claim 1 wherein M is hydrogen.

5. A compound of claim 1 which is 1-phosphonopropane-1, 2, 3-tricarboxylic acid.

6. A compound of claim 1 which is 1, 1-diphosphonopropane -2,3-dicarboxylic acid.

7. A compound of claim 1 which is 1-phosphonobutane -2, 3, 4-tricarboxylic acid.

8. A compound of claim 1 which is 2-phosphonobutane-2, 3, 4-tricarboxylic acid.

9. A compound of claim 1 which is 2, 2,-diphosphonobutane-3, 4-dicarboxylic acid.

10. A complex of claim 1 which is 2-phoshonobutane-2, 3, 4-tricarboxylic acid sodium salt complexed with calcium ions.

* * * * *

UNITED STATES PATENT AND TRADEMARK OFFICE
CERTIFICATE OF CORRECTION

PATENT NO. : 3,923,876
DATED : Dec. 2, 1975
INVENTOR(S) : Heins et al

It is certified that error appears in the above-identified patent and that said Letters Patent is hereby corrected as shown below:

Col. 8, Claim 1, line 4

Cancel "
$$-\underset{\underset{H}{|}}{\overset{\overset{COOM}{|}}{C}}-CH_2-\underset{\underset{R}{|}}{\overset{\overset{COOM}{|}}{C}}---\underset{\underset{R}{|}}{\overset{\overset{PO_3M_2}{|}}{C}}-$$
"

and substitute therefor $$--\underset{\underset{H}{|}}{\overset{\overset{COOM}{|}}{C}}-CH_2, \quad -\underset{\underset{R}{|}}{\overset{\overset{COOM}{|}}{C}}- \quad \text{and} \quad -\underset{\underset{R}{|}}{\overset{\overset{PO_3M_2}{|}}{C}}- \quad --$$

Signed and Sealed this

Sixth Day of August 1985

[SEAL]

Attest:

DONALD J. QUIGG

Attesting Officer     Acting Commissioner of Patents and Trademarks